F. W. HAVILAND.
HEAD FRAME FOR SUPPORTING EYEGLASSES.
APPLICATION FILED MAY 18, 1920.
1,380,957.
Patented June 7, 1921.
2 SHEETS—SHEET 1.
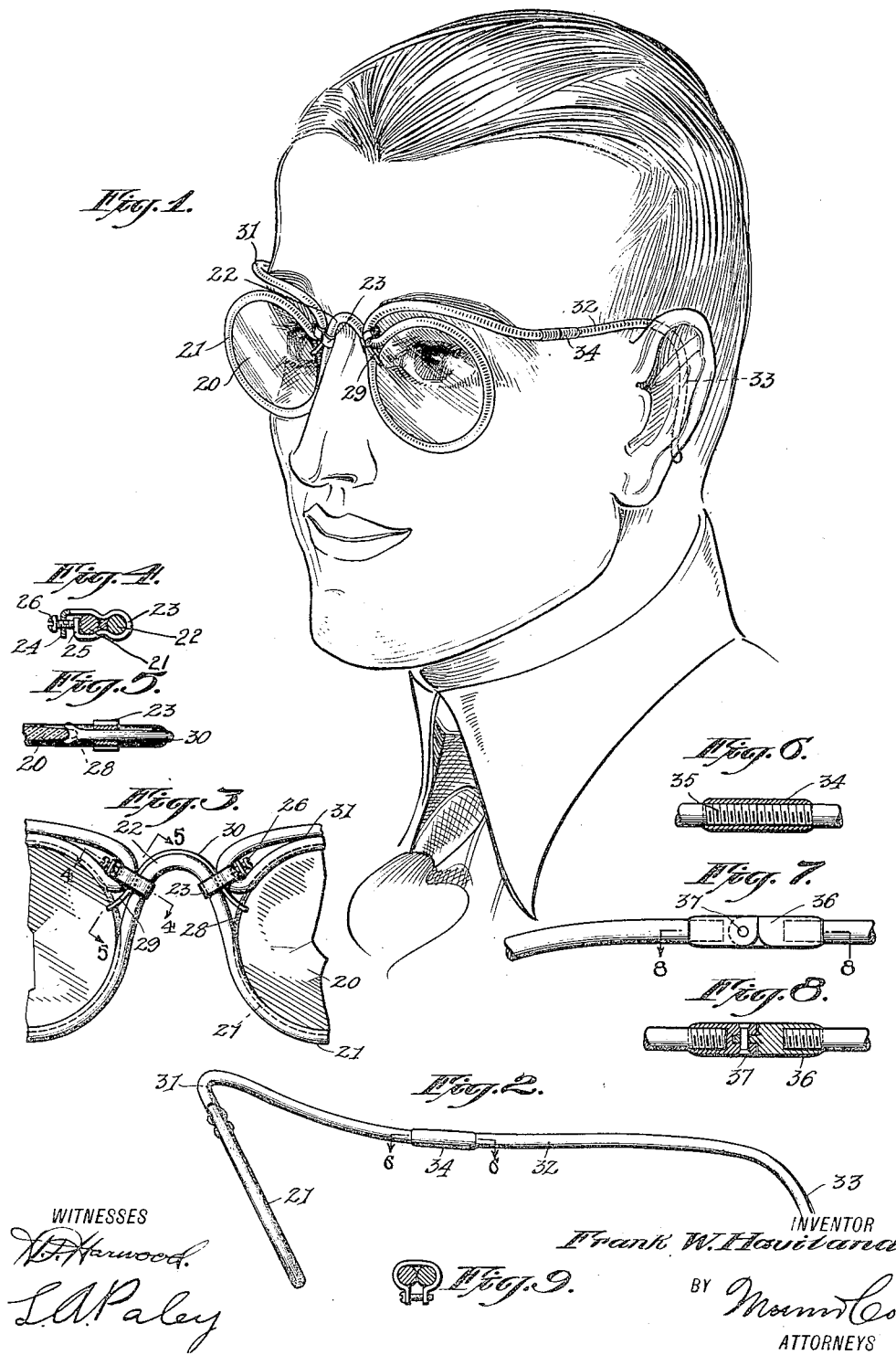
WITNESSES
INVENTOR
Frank W. Haviland.
BY
ATTORNEYS

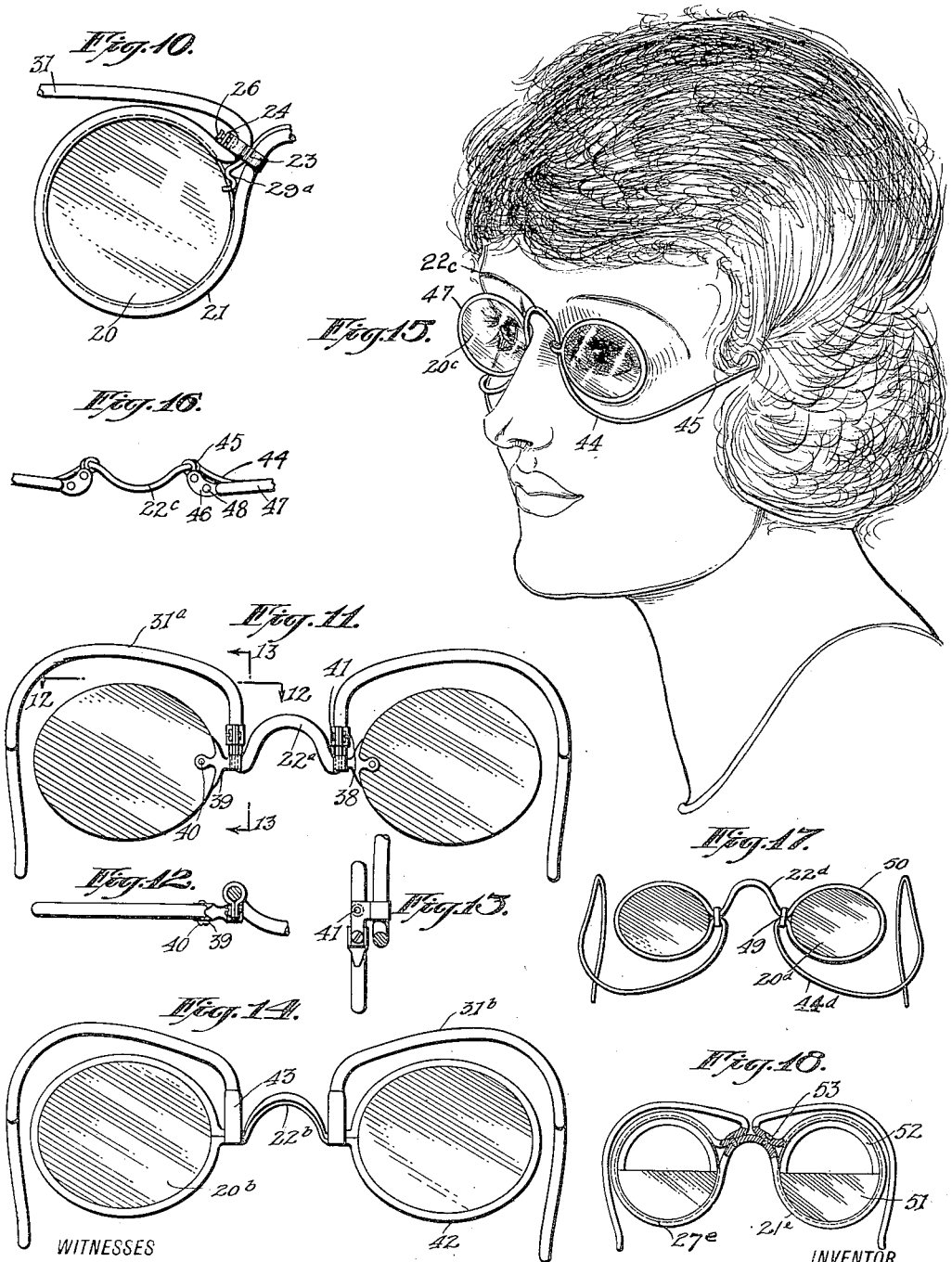

UNITED STATES PATENT OFFICE.

FRANK W. HAVILAND, OF NEW YORK, N. Y.

HEAD-FRAME FOR SUPPORTING EYEGLASSES.

1,380,957.  Specification of Letters Patent.  Patented June 7, 1921.

Application filed May 18, 1920. Serial No. 382,441.

*To all whom it may concern:*

Be it known that I, FRANK W. HAVILAND, a citizen of the United States, and a resident of the city of New York, borough of Manhattan, in the county and State of New York, have invented a new and Improved Head-Frame for Supporting Eyeglasses, of which the following is a full, clear, and exact description.

This invention relates to frames for eye glasses, and has reference more particularly to eye glasses which are provided with frames so arranged that they will engage the forehead or the cheeks.

An object of this invention is to provide frames for eye glasses in which the weight of the glasses will be taken from the bridge of the nose and supported by other parts of the head, such as the forehead or cheeks.

Reference is to be had to the accompanying drawings forming a part of this specification, in which it is understood that the drawings illustrate only one form of the invention, and in which Figure 1 is a perspective view of the eye glasses in position.

Fig. 2 is a side view of the frame.

Fig. 3 is a fragmentary front elevation of the bridge of the frame.

Fig. 4 is a section through the frame on the line 4—4 of Fig. 3.

Fig. 5 is a section through the frame on the line 5—5 of Fig. 3.

Fig. 6 is a section through the frame on the line 6—6 of Fig. 2.

Fig. 7 is a fragmentary side elevation of a modified folding frame.

Fig. 8 is a sectional view through a folding frame on the line 8—8 of Fig. 7.

Fig. 9 is a sectional view similar to Fig. 4 showing a modified form of fastening device.

Fig. 10 is a fragmentary elevation of a modified form of fastening device for the frame.

Fig. 11 is a front elevation of a modified form of the frame.

Fig. 12 is a view through the frame on the line 12—12 of Fig. 11.

Fig. 13 is a sectional view through the frame on the line 13—13 of Fig. 11.

Fig. 14 is a modified form of the frame.

Fig. 15 is a still further modified form of the frame in position.

Fig. 16 is a fragmentary top view of the frame shown in Fig. 15.

Fig. 17 is a front elevation of a modified form of the frame shown in Fig. 15.

Fig. 18 is a modified form of frame suitable for fractional parts of lenses.

Referring to the accompanying drawing by numerals, 20 indicates the lenses ordinarily used for correcting imperfections in the vision. My improvement consists in providing a supporting frame for the lenses which will take the weight of same off the bridge of the nose and support said weight from other parts of the head. My improved frame consists in lens rims 21 which extend around the lens and are secured together by integral nose bridge 22. The upper member of the rim 21 is secured to the bridge 22 by an adjustable fastener 23, said fastener consisting of preferably a metallic clip which extends on each side of the bridge 22 and the upper member of the rim 21. The ends of the fastening device 23 are provided with parallel flanges 24 and 25, and an adjusting screw 26 engages the flange 24, and bears against the flange 25 so as to press the bridge 22 and the upper member of the rim 21 tightly together, thus clamping the lenses 20 in place. The rim 21 is provided with an annular groove 27 around its inside surface which is adapted to receive a beveled edge 28 of the lens 20. When the lens corrects the eyesight for astigmatism, it is desirable to prevent the lens from turning in the groove 27, and for this purpose a clip 29 is secured by the fastener 23 between the bridge 22 and the upper member of the rim 21, one end of said clip 29 engaging a notch formed in the edge of the lens 20. The two clips 29 may be joined together by a brace 30 which passes over the bridge 22 as shown in Fig. 3, thus serving to reinforce the same. The clips 29 may be formed into a spring $29^b$ so that said clip 29 will be held resiliently into engagement with the notch in the lens 20. It is desirable to make the entire frame of one piece, and head supports 31 formed by bending the frame, lead up from the fasteners 23 and over the eyebrow, where they fit close to the head and serve to take some of the weight of the glasses from the bridge of the nose, thus being more comfortable to the wearer. The head supports 31 are again bent to substantially parallel temple supports 32 whose ends are bent downwardly behind the ears of the person to form ear supports 33. If desired, a union 34 may be provided on the temple supports 32, said union being threaded to receive the threaded ends 35 of the temple supports 32. Thus a number of different temple supports carrying the ear supports 33 can be tried out, each with a different length until the correct length to fit each individual's head is obtained. Instead of the union 34 a pair of threaded collars 36 may receive the threaded ends of the temple support 32, and said collars 30 can be secured together by a pin 37 so that the ear supports 33 can be folded together when it is desired to place the glasses in a case.

In the modified form shown in Fig. 11, the head supports $31_a$ are formed integral with the bridge $22_a$ and are provided with suitable fasteners 38 which have a forked arm 39 secured to the lens by a pin or screw 40. An adjusting screw 41 is provided on the fastener 38 so that said fastener may be clamped tightly about the head frame $31_a$. In the form shown in Fig. 14, the bridge $22_b$ may be of metal having rims 42 around the lenses $20_b$, and said bridge may be provided with sockets 43 in which the ends of the head frames $31_b$ are secured.

In the modified forms shown in Figs. 15 and 16, the bridge $22_c$ extends downwardly to form cheek supports 44 which rest on the cheek, and are formed into substantially parallel side supports 45 which lead back of the ears where they are provided with ear supports not shown. A fastener 45 is secured to each side of the bridge $22_c$ and said fastener is secured to an arm 46 of the lens rims 47 by fastening means such as rivets 48. The arm 46 might also be secured directly to the lens $20_c$ with a forked arm similar to the arm 39 shown in Fig. 11, so that the rims 47 will not then be used. The cheek support 44 takes the weight of the glasses off from the bridge of the nose, which makes the glasses more comfortable to wear. In the form shown in Fig. 17, the entire frame is made of one piece and the bridge $22_d$ and the cheek frame $44_d$ are connected together by a fastener 49 so as to form an integral loop 50 around the lens $20_d$. It is understood that the side supports 45 shown in Figs. 15 and 17 may be provided with a union as shown in Figs. 1, 2, and 6 or a hinge as shown in Figs. 7 and 8.

In the modified form shown in Fig. 18, the rims $21_e$ are provided with grooves $27_e$ which are adapted to receive a fractional part of a lens 51 which may have any desired shape. This lens 51 is held in position by an auxiliary rim 52 which fits in the groove $27_e$ thus holding said lens rigid. It should be noted, that in this form the rim $21_e$ is drawn together at the bridge by adjusting screws 53 which pass directly through the frame.

I would state in conclusion that while the illustrated examples constitute a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. In a device for supporting eye glasses, a bridge, a head frame, means for connecting said head frame to a person's ears, and means for securing a lens to said bridge and said frame, said head frame being adapted to support the weight of the eye glasses.

2. In a device for supporting eye glasses, a bridge, a rim formed integral with said bridge adapted to support a lens of said eye glass, a head frame formed integral with said rim, and ear supports connected with said head frame adapted to engage the ears of a person, said head frame being adapted to support the weight of said eye glasses.

3. A device as described in claim 2, characterized by means for preventing the movement of said lens in said rim.

4. A device as described in claim 2, characterized by a brace associated with and adapted to strengthen said bridge, and a notch formed in the periphery of the lens, the end of said brace being adapted to engage said notch so as to prevent said lens from moving in said rim.

5. In a device for supporting eye glasses, a bridge, a rim formed integral with said bridge, adjustable fastening means adapted to tighten said rim about said lens, a head frame formed integral with said rim adapted to engage the head of a person above the eyebrow so as to support the weight of said eye glasses, a temple support formed on said head support, and an ear support formed on said temple support adapted to engage the ear of a person.

6. A device as described in claim 5, characterized by adjusting means associated with said temple support.

7. A device as described in claim 5, characterized by a hinge element associated with said temple support adapted to allow the folding of said ear support so that the glasses may be placed inside a case.

8. In a device for supporting eye glasses, a bridge, a rim formed integral with said bridge and adapted to support a fractional part of a lens, an auxiliary rim inside the first mentioned rim, adjustable fastening means adapted to tighten said rims about said lens, and means associated with said bridge for supporting said eye glasses from the head.

9. In a device for supporting eye glasses, a bridge, a rim formed integral with said bridge adapted to support a lens, and a head frame secured to said rim at the innermost point of the lens adapted to support said eye glasses from the head.

FRANK W. HAVILAND.